(12) United States Patent
Wright et al.

(10) Patent No.: US 10,316,961 B2
(45) Date of Patent: Jun. 11, 2019

(54) METHOD FOR CONTROLLING UPSHIFT SEQUENCING

(71) Applicant: GM GLOBAL TECHNOLOGY OPERATIONS LLC, Detroit, MI (US)

(72) Inventors: Henry R Wright, Huntington Woods, MI (US); Brandon M Fell, Milford, MI (US); Mateusz M Nowak, Dearborn, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 100 days.

(21) Appl. No.: 15/484,785

(22) Filed: Apr. 11, 2017

(65) Prior Publication Data

US 2018/0292003 A1    Oct. 11, 2018

(51) Int. Cl.
| | |
|---|---|
| *B60W 10/10* | (2012.01) |
| *F16H 61/02* | (2006.01) |
| *B60W 30/18* | (2012.01) |
| *F16H 59/18* | (2006.01) |
| *F16H 59/54* | (2006.01) |
| *F16H 59/70* | (2006.01) |

(52) U.S. Cl.
CPC ......... *F16H 61/0213* (2013.01); *B60W 10/10* (2013.01); *B60W 30/18072* (2013.01); *F16H 59/18* (2013.01); *F16H 59/54* (2013.01); *F16H 59/70* (2013.01); *F16H 2059/183* (2013.01); *F16H 2061/0216* (2013.01); *Y10T 477/679* (2015.01); *Y10T 477/68* (2015.01); *Y10T 477/688* (2015.01); *Y10T 477/692* (2015.01)

(58) Field of Classification Search
CPC ............ Y10T 477/688; Y10T 477/692; Y10T 477/679; Y10T 477/68; B60W 10/10; B60W 30/18072; F16H 59/70; F16H 59/54; F16H 59/18; F16H 2059/183; F16H 2061/0216
See application file for complete search history.

(56) References Cited

U.S. PATENT DOCUMENTS

| | | | | |
|---|---|---|---|---|
| 5,079,705 | A * | 1/1992 | Sakai | F16H 61/0213 477/120 |
| 5,113,721 | A * | 5/1992 | Polly | B60K 28/165 477/80 |
| 9,068,518 | B2 * | 6/2015 | Lochocki, Jr. | B60W 50/0097 |
| 2017/0174219 | A1 * | 6/2017 | Omran | B60K 31/042 |
| 2017/0314679 | A1 * | 11/2017 | Verheijen | B60R 16/0236 |

FOREIGN PATENT DOCUMENTS

EP    0270195 A2 *  6/1988  ........... B60K 31/042

* cited by examiner

*Primary Examiner* — Roger L Pang

(57) ABSTRACT

A method for transmission upshift sequencing includes detecting a lift foot gear hold condition is met and that a current engine speed is greater than a pattern gear engine speed for the current gear. If these conditions exists then the current gear is held until a first sequence timer expires and then an upshift event occurs to a first gear having an engine speed less than the current engine speed. The first gear is then held until a at least one other sequence timer expires and, thereafter, at least one other gear is selected and held until the engine speed is less than or equal to a pattern gear engine speed.

20 Claims, 7 Drawing Sheets

FIG. 2B

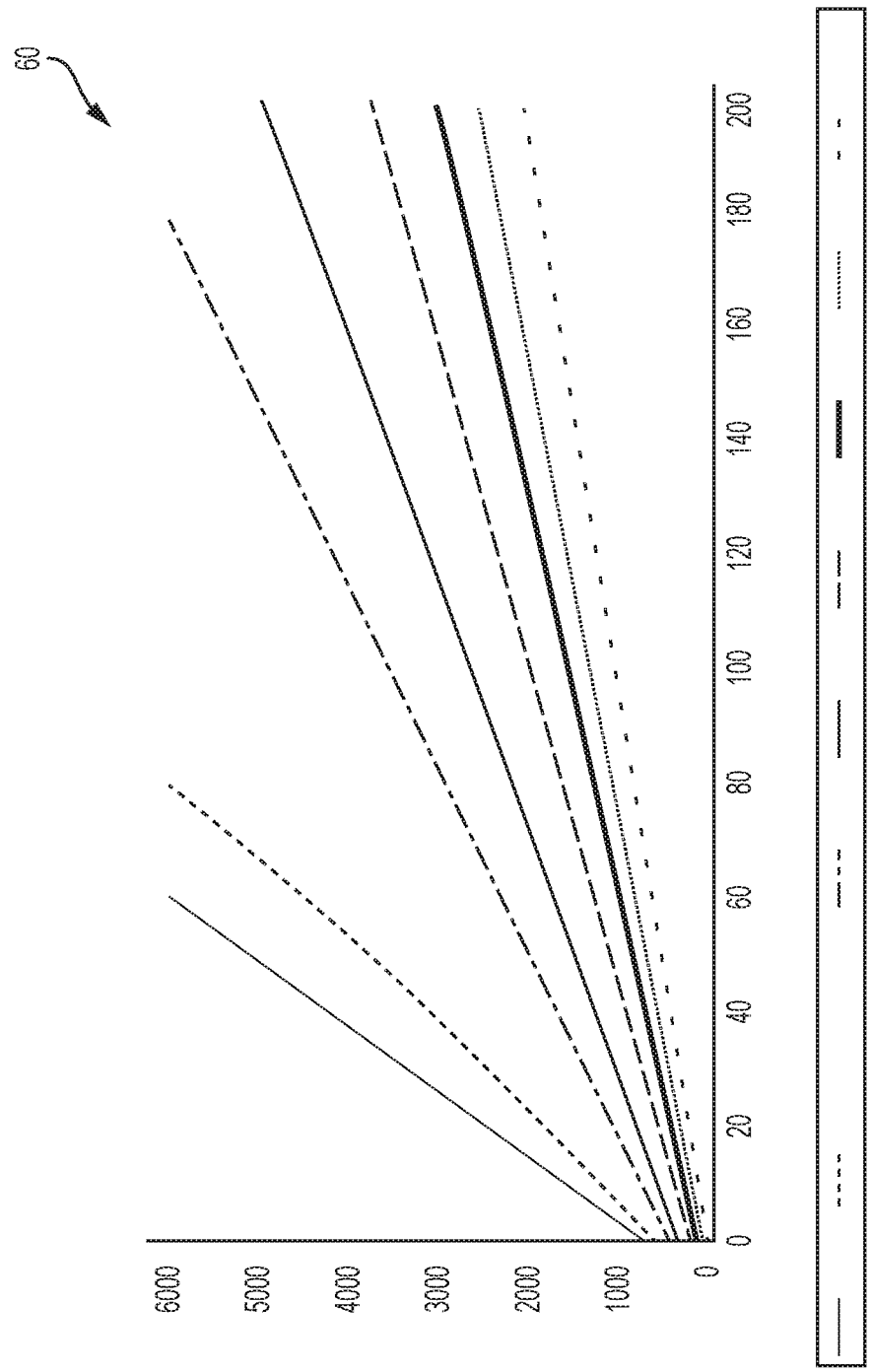

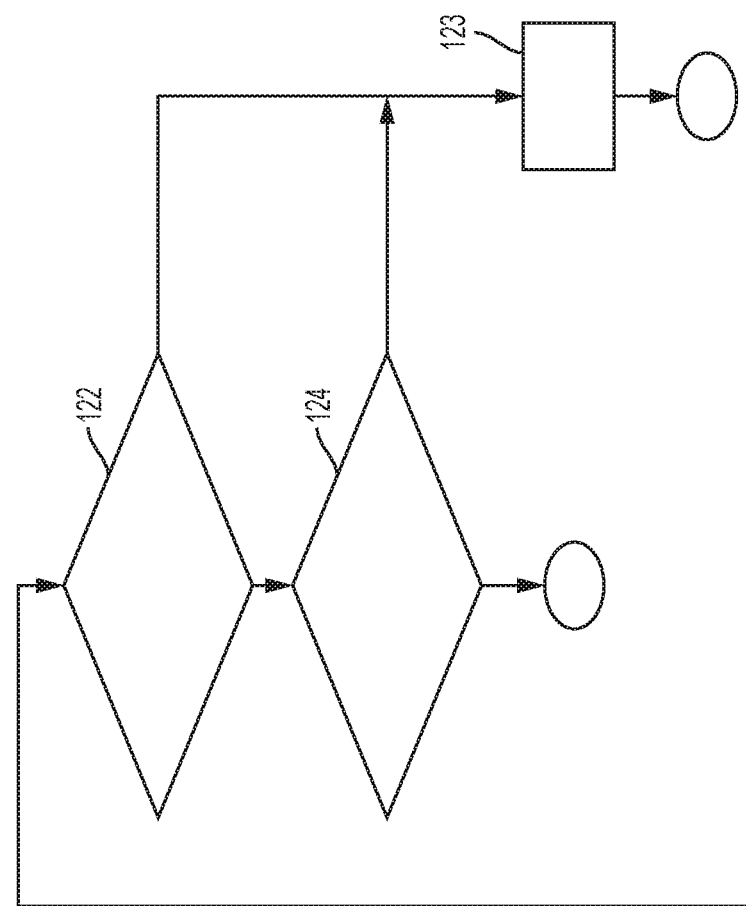
FIG. 3B
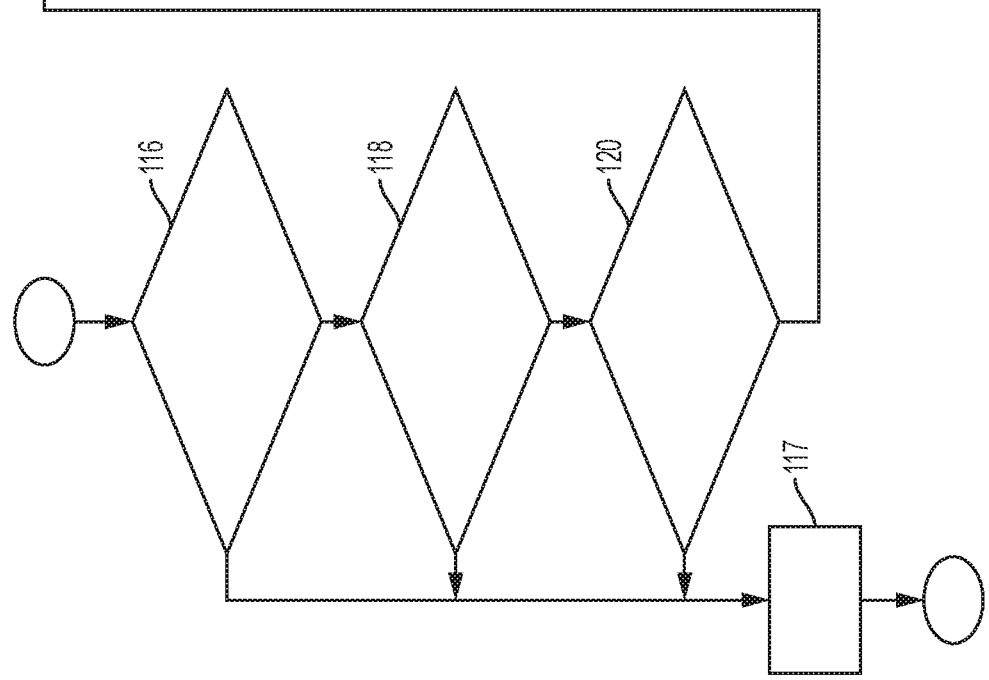

METHOD FOR CONTROLLING UPSHIFT SEQUENCING

FIELD

The invention relates generally to automobile transmissions and more particularly to a method for controlling transmission upshift sequencing.

BACKGROUND

The statements in this section merely provide background information related to the present disclosure and may or may not constitute prior art.

Many transmission shift pattern features have the ability to hold a lower gear than requested by pattern for a predetermined period of time before shifting. Once the conditions to hold the lower gear are no longer true (e.g. pedal tip-in/power on) then the transmission upshifts to the next pattern gear immediately. Electronically controlled shift point sequencing has been developed to catch these transitions and control the desired gear towards a pattern gear with a smooth transition and in a way that provides consistent performance to the customer.

In order to realize more advantages multi-speed transmissions such as better fuel economy, improved driveability, and shifting smoothness, a proper gear shift strategy being implemented in a transmission control module is of substantial importance.

The transmission mediates between the engine power and the power demand at the wheels by choosing a suitable gear ratio. Under dynamic driving conditions, the transmission is required to shift in order to match the power requirements commanded by the operator. A gear shift decision is also required to be consistent such that vehicle can remain in the next gear for a period of time without deteriorating the acceleration capability. Otherwise, this will result in an unwanted engine lugging and shift busyness of the gear box.

As transmissions get more gear ratios, e.g., 8, 9, 10, or higher multi-speed transmissions, the task of choosing the most appropriate gear to match the current driving conditions become increasingly difficult. Thus, while current strategies for automatically controlling the upshift sequencing of transmissions achieve their intended purpose, there is a desire to have a strategy for controlling the upshift sequencing of high multi-speed transmissions.

SUMMARY

One or more exemplary embodiments address the above issue by providing an automobile transmission system, and more particularly to a method for controlling transmission upshift sequencing.

According to aspects of an exemplary embodiment, a method of for controlling transmission upshift sequencing includes detecting a lift foot gear hold condition and a current engine speed is greater than a pattern gear engine speed for current gear. Another aspect of the exemplary embodiment includes holding the current gear until a first sequence timer expires when a lift foot gear hold condition exists and the current engine speed is greater than the pattern gear engine speed for the current gear is detected. Still another aspect of the exemplary embodiment includes upshifting to a first gear having an engine speed less than the current engine speed. And still another aspect of the exemplary embodiment includes holding the first gear until at least one other sequence timer expires. And another aspect includes upshifting to at least one other gear greater than the first gear and having an engine speed less than the engine speed of the first gear. And still another aspect includes holding the at least one other gear until the at least one other sequence timer expires and the engine speed is less than or equal to a pattern gear engine speed for the at least one other gear.

Yet another aspect of the exemplary embodiment wherein detecting further includes using an accelerator pedal position sensor, a lateral G force sensor, a brake pedal position sensor, and a crank sensor to detect a lift foot gear hold condition. And yet another aspect wherein detecting includes determining an accelerator pedal tip-in rate, accelerator pedal tip-out rate and hold time in current gear. And still another aspect wherein detecting includes determining if actual vehicle speed is greater than a predetermined vehicle speed for the current gear.

A further aspect of the exemplary embodiment wherein holding the current gear further includes determining a sequence timer period based on the current gear and engine speed. Yet a further aspect of the exemplary embodiment wherein upshifting includes choosing a first gear greater than the current gear that has an engine speed less than the current engine speed. And still a further aspect of the exemplary embodiment wherein upshifting further comprises determining if the chosen gear is less than a predetermined pattern gear. And another aspect wherein upshifting includes cancelling the upshift if the chosen gear is less than the predetermined pattern gear.

And another aspect in accordance with the exemplary embodiment includes determining the sequence timer based on the chosen gear and the engine speed of the chosen gear. Another aspect of the exemplary embodiment includes resetting the first and at least one other sequence timer when brake is on and engine speed is less than or equal to a predetermined braking engine speed threshold. And still another aspect of the exemplary embodiment includes resetting the first and at least one other sequence timer when an accelerator pedal power on/off status changes.

In accordance with another aspect of the exemplary, the method further includes freezing the first and at least one other sequence timer when a gear shift is in progress. And another aspect of the exemplary embodiment includes freezing the first and at least one other sequence timer when an accelerator pedal position tip-in rate is greater than a predetermined accelerator pedal position tip-in rate threshold.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 2B is an illustration of power on and power off look up tables used during a transmission upshift sequencing event in accordance with aspects of the exemplary embodiment;

FIG. 2C is an illustration of graph of engine speed to vehicle speed relationship for various gears of a multi-speed transmission in accordance with an aspects of the exemplary embodiment;

FIG. 3B is a continuation of the illustration of an algorithm for controlling transmission upshift sequencing in accordance with an aspects of the exemplary embodiment.

DETAILED DESCRIPTION

The following description is merely exemplary in nature and is not intended to limit the present disclosure, application, or uses.

Figure 1:
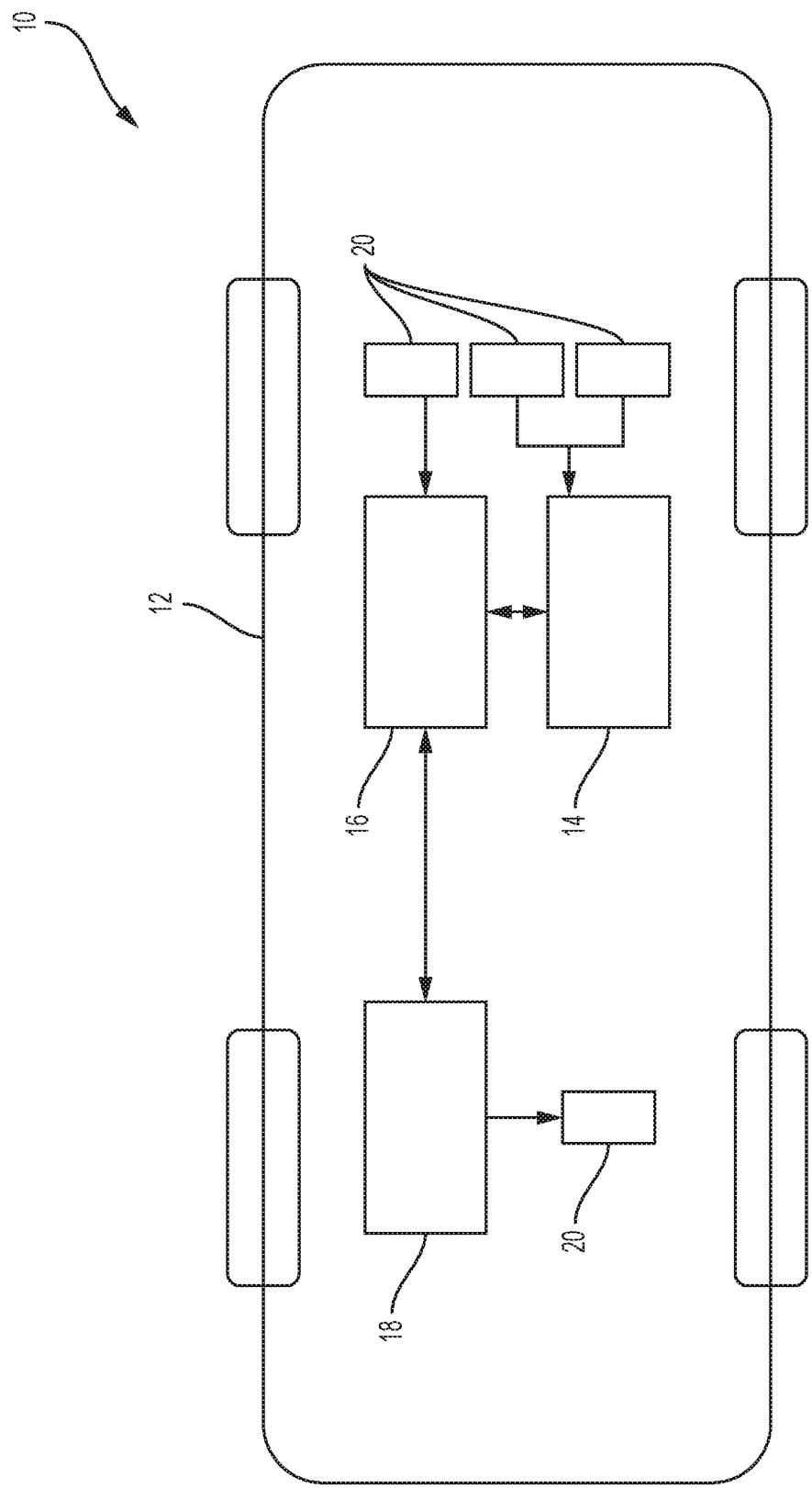
FIG. 1 is an illustration of a block diagram for a vehicle having control modules and sensors in accordance with an aspect of the exemplary embodiment.

With reference to FIG. 1, an exemplary block diagram 10 for a vehicle 12 having control modules (14, 16, 18) and sensors 20. The vehicle 12 includes a transmission control module (TCM) 14, an engine control module (ECM) 16, and a body control module (BCM). In accordance with the exemplary embodiment, sensors 20 are in communication with the TCM 14, ECM 16 and BCM 18 and can include, for example, an accelerator position sensor that senses the instantaneous position of an accelerator pedal, a brake pedal position sensor that senses the position of a brake pedal, a crank sensor for determining engine speed and vehicle speed, and a lateral G force sensor for determining side forces on a vehicle when cornering hard. The sensors 20 can then provide that information to the control modules (14, 16, and 18).

The ECM 16 operates as the "brain" of a vehicle and controls a plurality of actuators on an internal combustion engine to ensure optimal engine performance. The TCM 14 receives electrical signals from various sensors and data from the ECM 16 to regulate the gear shifting for optimal vehicle performance. The ECM 16 can compute the driver's commanded engine torque based on the vehicle speed and the position of accelerator pedal which sends a signal representative of the driver's torque request to the TCM 14. The ECM 16 can also use the instantaneous position of the accelerator pedal (interpreted from an accelerator pedal position sensor signal) to compute a rate of the accelerator pedal position (or accelerator pedal position rate), and use the engine speed (from a cam sensor) to compute an engine acceleration and/or vehicle speed.

The vehicle 12 includes internal combustion engine (not shown) that supplies a driving torque to the transmission (not shown). Traditionally, a transmission may be identified by the number of gear ratios it includes, for example, a 6, 8, 9, or 12 speed transmission. The transmission, capable of several forward gear ratios, in turn delivers torque to the driveshaft (not shown) and vehicle wheels.

Figure 2A:
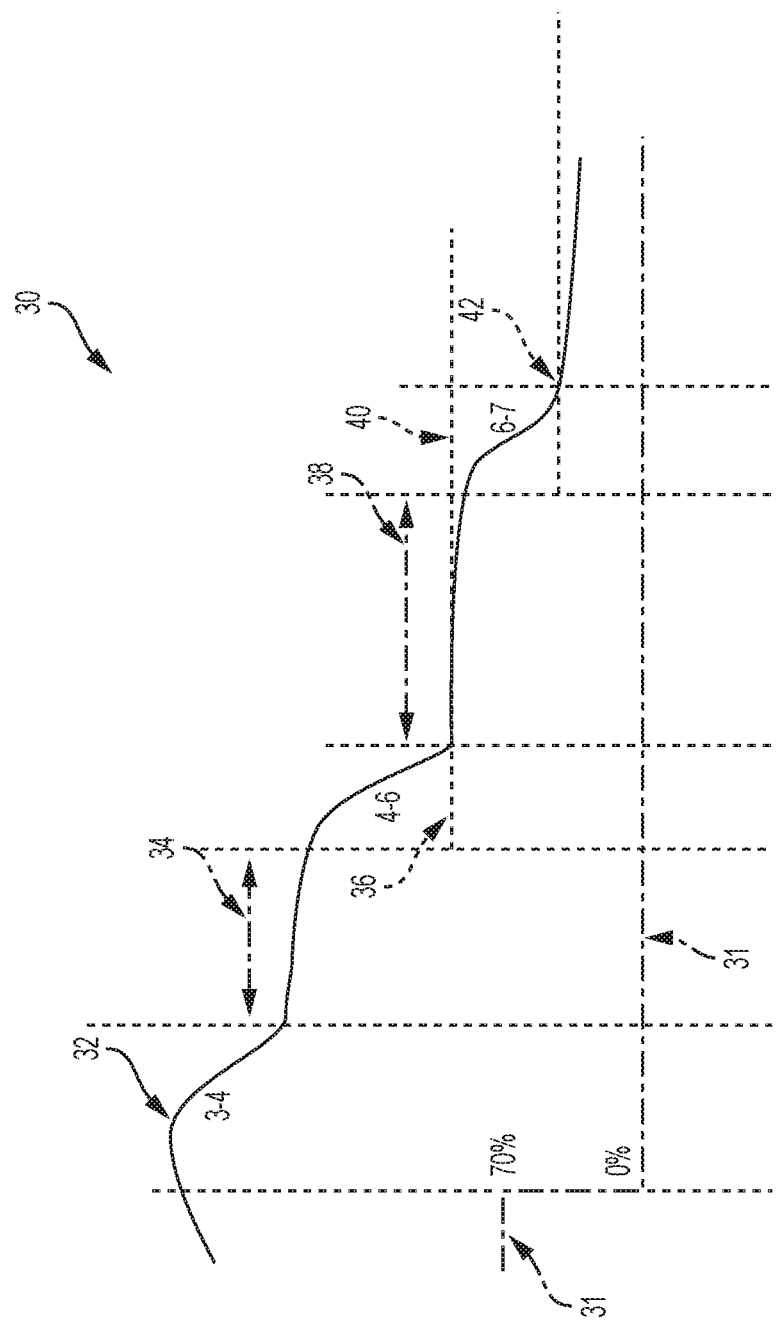
FIG. 2A is an illustration of a line graph of a transmission upshift sequencing event in accordance with an aspect of the exemplary embodiment.
Figure 2B:
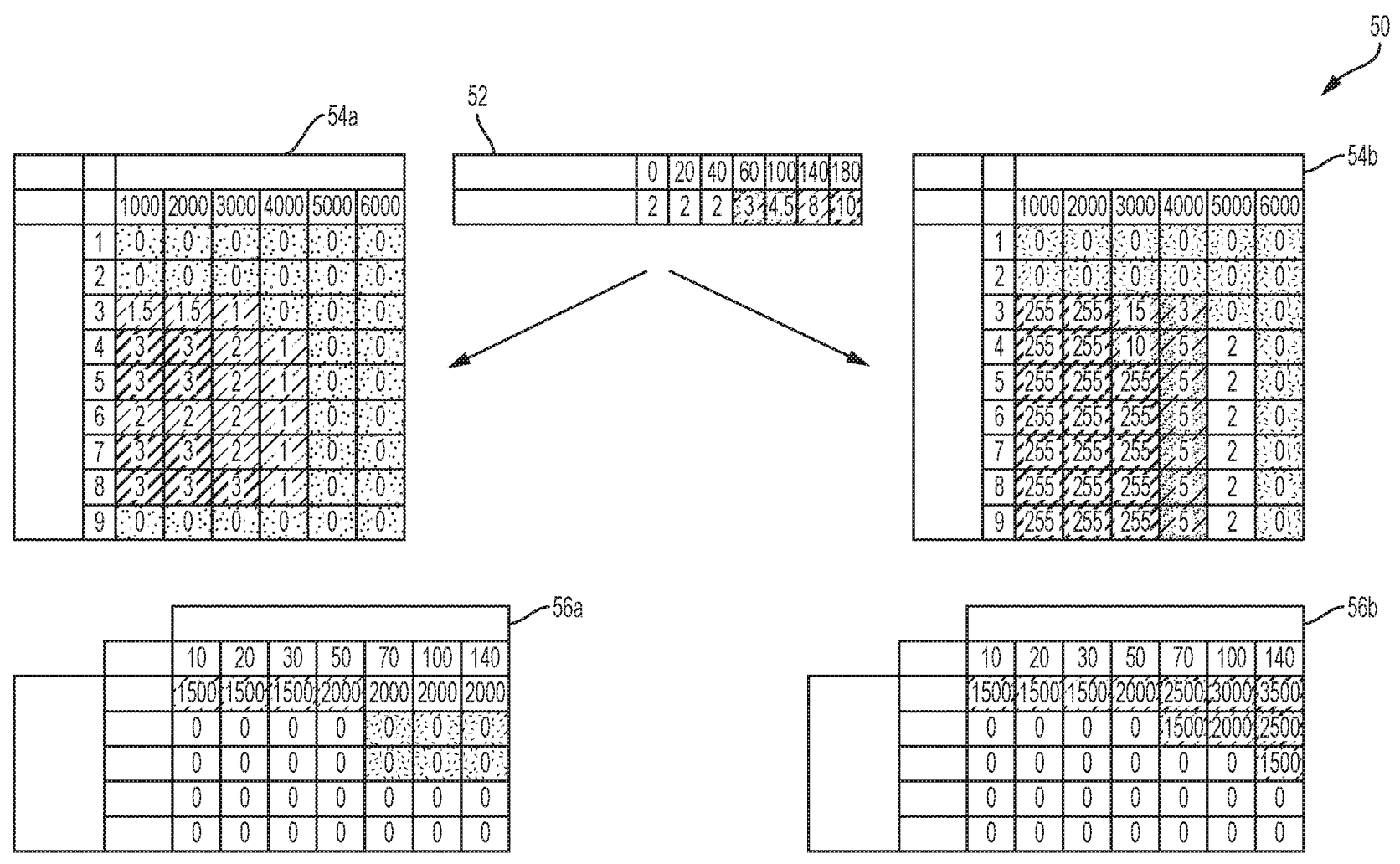

Turning now to FIGS. 2A-2C, an example of controlling transmission upshift sequencing in accordance with the exemplary embodiment will be presented. FIG. 2A is an illustration of a line graph 30 of a transmission upshift sequencing event. Beginning at sequence interval 32, the vehicle is traveling at a speed of 100 km/h and a lift foot gear hold (LFGH) condition is triggered when the operator's foot is lifted from the accelerator pedal causing the accelerator input signal 31 to decrease to a minimum (power off or tip-out condition). When approaching the end of sequence interval 32, the transmission is operating in the 4th gear range and, referencing FIG. 2C, the relative engine speed when operating at a vehicle speed of 100 km/h in $4^{th}$ gear is approximately 3500 revolutions/minute (RPM).

Referring now to FIG. 2B, an illustration of power on and power off look up tables 50 used during a transmission upshift sequencing event 30 in accordance with aspects of the exemplary embodiment is provided. Starting now at interval 34 with vehicle operating parameters of $4^{th}$ gear, vehicle speed 100 km/h, and engine speed 3500 RPM, reference is made to look up table 54b to determine a first sequence timer period to hold the current gear ($4^{th}$ gear) before upshifting to a more appropriate gear for the current engine speed (100 km/h). According to look up table 54b, at an engine speed of 3500 RPM in $4^{th}$ gear the sequence timer period to hold would be (5) five seconds.

At the expiration of the first sequence timer period of (5) five seconds, a target upshift gear is chosen at sequence interval 36 by initially referencing look up table 56b. Look up table 56b is used to determine a first target upshift engine speed based on the current vehicle speed of 100 km/h which would be 3000 RPM for the first sequence step. Now, using the first target upshift engine speed of 3000 RPM, we refer back to FIG. 2C to determine the next highest gear in the upshift sequence that has an engine speed less than 3000 RPM at 100 km/h. That target upshift gear is determined to be $5^{th}$ gear having an upshift engine speed of approximately 2500 RPM. Thus, the target upshift gear to shift to at the expiration of the first sequence timer period of 5 seconds is $5^{th}$ gear, and the target upshift engine speed is approximately 2500 RPM.

Now at the beginning of interval 38 of FIG. 2A, we determine a at least one other sequence timer period to hold the chosen target upshift gear ($5^{th}$ gear) before continuing upshift sequence. Referencing look up table 54b of FIG. 2B, it is determined that an engine speed of 2500 RPM in $5^{th}$ gear would be held for a sequence timer period of (255) seconds before upshifting to at least one other gear. After the (255) at least one other sequence timer period expires, in accordance with sequence interval 40 of FIG. 2A, at least one other target upshift gear (next upshift gear) is chosen based vehicle speed and engine speed referencing 56b.

It is appreciated that after the at least one other sequence timer period of (255) at least one other has expired that the vehicle speed will have decreased significantly. It is also appreciated that the upshift sequencing events are under the control of the TCM 14 which receives all of the vehicle operating parameters, e.g., vehicle speed, lateral G force, pedal positions, etc., from sensors 20 and/or the ECM 16 accordingly for determining when to perform an upshift sequencing event, calculate the sequence timer periods, and choose next target upshift gears in accordance with aspects of the exemplary embodiment. The upshifting sequence event of FIG. 2A continues at interval 42 and possibly thereafter until the at least one other gear and engine speed RPM are less than or equal to a predetermined pattern gear.

Referring again to FIG. 2B, the look up tables 54a and 56a are configured to be used in the same manner by the TCM 14 as the look up tables 54b and 56b with the only difference being that the accelerator pedal status will be "power on" meaning that a "tip-in" condition exists rather than "power off" or "tip-out" condition described above.

Figure 3A:
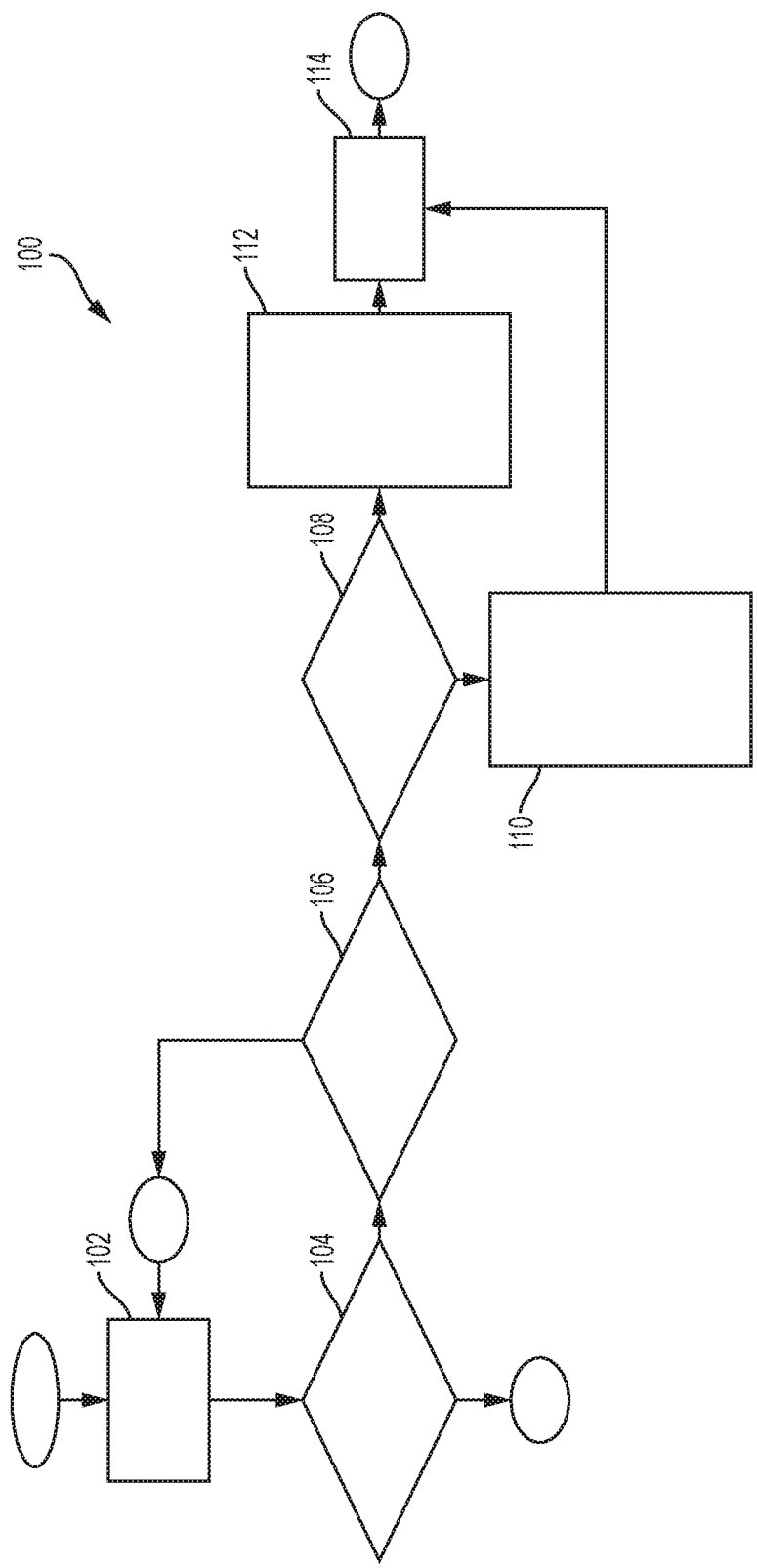
FIG. 3A is an illustration of an algorithm for controlling transmission upshift sequencing in accordance with an aspects of the exemplary embodiment.
Figure 3C:
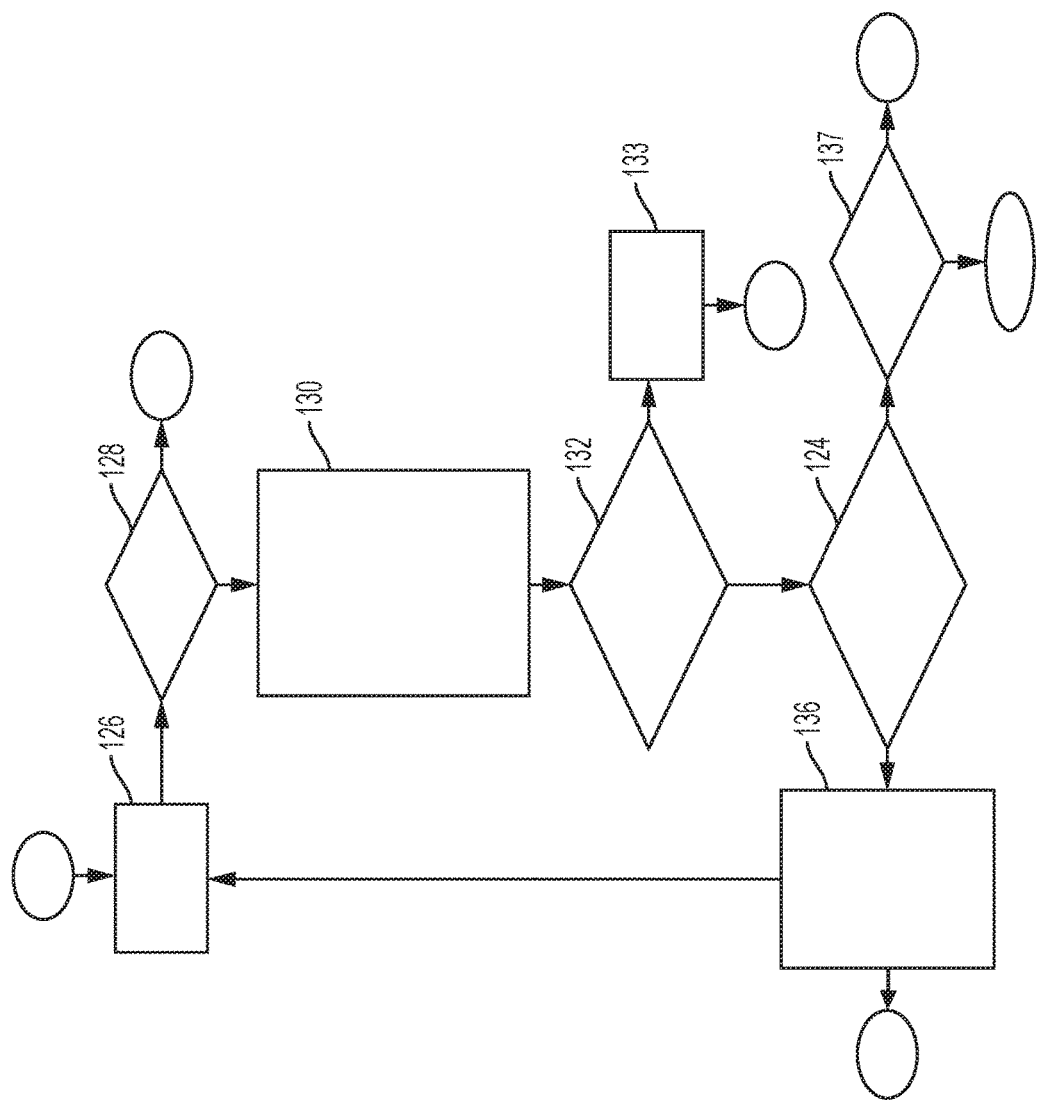
FIG. 3C is an additional continuation of the illustration of an algorithm for controlling transmission upshift sequencing in accordance with an aspects of the exemplary embodiment.

FIGS. 3A-3C are illustrations of an algorithm 100 for controlling transmission upshift sequencing in accordance with an aspects of the exemplary embodiment. At block 102, the method begins with detecting various vehicle parameters for determining if a LFGH condition is met. These vehicle parameters include, but may not be limited to, accelerator pedal rate tip-in/tip-out, brake pedal position, accelerator pedal position, lateral G force, and time in current gear.

At block 104, the method continues with determining if a LFGH condition exists. If not, then the method returns to block 102. If a LFGH condition is detected then the method continues to block 106.

At block 106, the method continues with determining if the actual vehicle speed is greater than the vehicle speed for the current gear. If the vehicle speed is not greater than the current vehicle speed then the method returns to block 102. Otherwise, the method continues at block 108 to determine if the "power on" or a "tip-in" condition exists. If a "power on" condition exists then, at block 110, the sequence timer period for which to hold the transmission in the current gear determined from the power on look up table stored in the TCM. If a "power off" condition exists then, at block 112, a sequence timer period for which to hold the transmission in the current gear is determined from the "power off" look up table. Then the method continue at block 114 where the upshift sequence timer is started.

Referring now to FIG. 2B, the method continues with determining if any conditions exist that would cause the upshift sequence event to be interrupted. At block 116, the method continues with determining if the brake pedal is engaged (brake on) and engine speed is less than or equal to a predetermined braking engine speed threshold. If the brake pedal is engaged and engine speed is less than or equal to a predetermined braking engine speed threshold then, at block 117, the up sequence timer is reset and the method returns to block 116.

If the brake pedal is not engaged (brake on) and not engine speed is less than or equal to a predetermined braking engine speed threshold then the method continues at block 118 with determining if the lateral G force is high, e.g. 0.4 Earth's g-force, and if the engine speed is less than or equal to a predetermined lateral G engine speed. If the lateral G force is high and if the engine speed is less than or equal to a predetermined lateral G engine speed then, at block 117, the up sequence timer is reset and the method returns to block 116.

If the lateral G force is not high and if the engine speed is not less than or equal to a predetermined lateral G engine speed then, at block 120, the method continues with determining if the accelerator pedal power "on/off" status has changed. If the status has changed then, at block 117, the up sequence timer is reset and the method returns to block 116.

If the accelerator pedal power "on/off" status has not changed then, at block 122, the method continues with determining if a gear shift is in progress. If a gear shift is on progress then, at block 123, the upshift sequence timer is stopped or "frozen" and the method returns to block 116. If the gear shift is not in progress then the method moves to block 124.

At block 124, the method continues with determining if the accelerator pedal position is increasing at a rate greater than a predetermined pedal increase rate. If so, then the method moves to block 123 where the upshift sequence timer is "frozen" and the method returns to block 116. If the accelerator pedal position is not determined to be increasing at a rate greater than a predetermined pedal increase rate then the method moves to block 126 of FIG. 3c where the upshift sequence timer is incremented.

From block 126 of FIG. 3C, the method continues at block 128 with determining if the upshift sequence timer has expired. If the sequence timer has not expired then the method returns to block 116. If the timer has expired then the method continues at block 130 with choosing a target engine speed based on vehicle speed, and then choosing a target gear that is greater than the current gear that has a desired engine speed less than the target engine speed (RPM).

At block 132, the method continues with determining if the chosen gear has an engine speed less than or equal to the desired engine speed. If not, then, at block 133, the transmission will be incremented to the next highest gear. If the chosen gear has an engine speed less than or equal to the desired engine speed then the method continues at block 134 with determining if the chosen gear is less than or equal to the predetermined pattern gear. If the chosen gear is not less than or equal to the predetermined pattern gear then, at block 136, the method continues with determining an upshift sequence timer period to hold the chosen gear based on the engine speed of the chosen gear. Once the upshift sequence timer has been determined, the method returns to block 126 for incrementing the sequence timer.

If the chosen gear is less than or equal to the predetermined pattern gear then, at block 137, the method continues with determining if the engine is still on. If so, then the method returns to block 102 to continue. If not, then the upshift sequencing method ends.

The description of the method is merely exemplary in nature and variation that do not depart from the gist of the embodiment are intended to be within the scope of the embodiment. Such variations are not to be regarded as a departure from the spirit and scope of the exemplary embodiment.

What is claimed is:

1. A method for transmission upshift sequencing comprising:
   detecting a lift foot gear hold condition and a current engine speed is greater than a pattern gear engine speed for current gear;
   holding the current gear until a first sequence timer expires when the lift foot gear hold condition exists and the current engine speed is greater than the pattern gear engine speed for the current gear is detected;
   upshifting to a first gear having an engine speed less than the current engine speed;
   holding the first gear until at least one other sequence timer expires;
   upshifting to at least one other gear greater than the first gear and having an engine speed less than the engine speed of the first gear; and
   holding the at least one other gear until the at least one other sequence timer expires and the engine speed is less than or equal to a pattern gear engine speed for the at least one other gear.

2. The method of claim 1 wherein detecting the lift foot gear hold condition further comprises using an accelerator pedal position sensor, a lateral G force sensor, a brake pedal position sensor, and a crank sensor.

3. The method of claim 2 wherein detecting the lift foot gear hold condition further comprises determining an accelerator pedal tip-in rate, accelerator pedal tip-out rate and hold time in current gear.

4. The method of claim 1 wherein detecting the lift foot gear hold condition further comprises determining if actual vehicle speed is greater than a predetermined vehicle speed for the current gear.

5. The method of claim 1 wherein holding the current gear further comprises determining a sequence timer period based the current gear and engine speed.

6. The method of claim 1 wherein upshifting to the first gear further comprises choosing the first gear greater than the current gear that has an engine speed less than the current engine speed.

7. The method of claim 6 wherein upshifting to the first gear further comprises determining if the chosen gear is less than a predetermined pattern gear.

8. The method of claim 7 wherein upshifting to the first gear further comprises cancelling the upshift if the chosen gear is less than the predetermined pattern gear.

9. The method of claim 8 wherein holding the first gear further comprises determining the sequence timer based on the chosen gear and the engine speed of the chosen gear.

10. The method of claim 1 further comprising resetting the first and at least one other sequence timer when brake is on and engine speed is less than or equal to a predetermined braking engine speed threshold.

11. The method of claim 2 further comprising resetting the first and at least one other sequence timer when an accelerator pedal power on/off status changes.

12. The method of claim 1 further comprising freezing the first and at least one other sequence timer when a gear shift is in progress.

13. The method of claim 1 further comprising freezing the first and at least one other sequence timer when an accelerator pedal position tip-in rate is greater than a predetermined accelerator pedal position tip-in rate threshold.

14. A method for transmission upshift sequencing comprising:
   detecting a lift foot gear hold condition and a current engine speed is greater than a pattern gear engine speed for current gear;
   determining a sequence timer period based the current gear and engine speed;
   holding the current gear until the sequence timer period expires when the lift foot gear hold condition exists and the current engine speed is greater than the pattern gear engine speed for the current gear is detected;
   upshifting to a first gear having an engine speed less than the current engine speed;
   holding the first gear until at least one other sequence timer expires;
   upshifting to at least one other gear greater than the first gear and having an engine speed less than the engine speed of the first gear; and
   holding the at least one other gear until the at least one other sequence timer expires and the engine speed is less than or equal to a pattern gear engine speed for the at least one other gear.

15. The method of claim 14 wherein detecting the lift foot gear hold condition further comprises using an accelerator pedal position sensor, a lateral G force sensor, a brake pedal position sensor.

16. The method of claim 15 wherein detecting the lift foot gear hold condition further comprises determining an accelerator pedal tip-in rate, accelerator pedal tip-out rate and hold time in current gear.

17. The method of claim 14 wherein detecting the lift foot gear hold condition further comprises determining if actual vehicle speed is greater than a predetermined vehicle speed for the current gear.

18. The method of claim 14 wherein upshifting to the first gear further comprises choosing the first gear greater than the current gear that has an engine speed less than the current engine speed.

19. The method of claim 18 wherein upshifting to the first gear further comprises determining if the chosen gear is less than a predetermined pattern gear.

20. The method of claim 19 wherein upshifting to the first gear further comprises cancelling the upshift if the chosen gear is less than the predetermined pattern gear.

* * * * *